Figure 1:
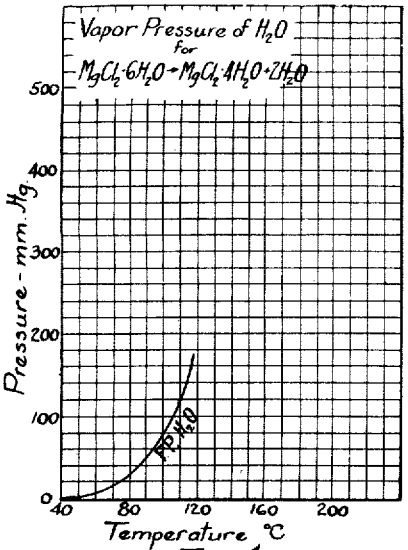

Patented Dec. 8, 1931

1,835,818

UNITED STATES PATENT OFFICE

ALBERT KELVIN SMITH, OF SHAKER HEIGHTS VILLAGE, AND WILLIAM R. VEAZEY, OF CLEVELAND HEIGHTS, OHIO, ASSIGNORS TO THE DOW CHEMICAL COMPANY, OF MIDLAND, MICHIGAN, A CORPORATION OF MICHIGAN

DEHYDRATION OF MAGNESIUM CHLORIDE

Application filed September 13, 1929. Serial No. 392,456.

The dehydration of normal hydrated magnesium chloride, $MgCl_2.6H_2O$, as is well known, is attended with numerous difficulties, due to the great tendency toward decomposition with formation of basic magnesium chloride, or oxide, and hydrochloric acid. Special precautions must be taken to prevent, or at least to minimize, such decomposition in order to obtain a satisfactory product.

When magnesium chloride hexahydrate is dried or dehydrated a number of lower hydrated forms of the salt are produced successively, until finally the anhydrous salt is obtained. These intermediate hydrates each possess a definite composition, containing four, two and one molecule of water of crystallization, respectively. Accompanying the dehydration of each hydrate to the next lower hydrated form there is a definite decomposition pressure of hydrochloric acid. The four separate stages of dehydration are represented by the following equations:—

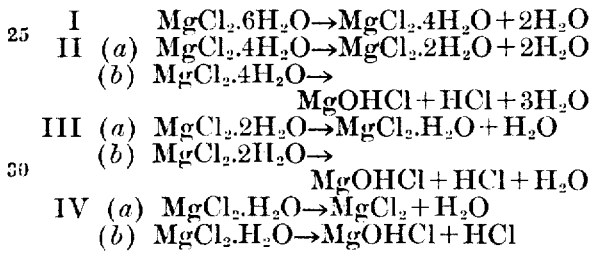

In the pairs of equations, Eq. (a) represents the process of dehydration and Eq. (b) that of decomposition. For stage I no decomposition equation is given, since the tendency toward decomposition in that stage, if present at all, is so small as to be practically negligible. In each of the succeeding stages, however, the decomposition pressure is a readily ascertainable quantity, increasing in value from each stage to the next, which may be calculated from the partial pressures of water vapor and hydrochloric acid.

We have determined the partial pressures of water vapor and hydrochloric acid for the several hydrated forms of magnesium chloride over a temperature range for each form up to the fusion or transition point thereof to the next lower hydrated form. From the values so obtained we have calculated the amount of dehydration and decomposition in each drying stage, and have determined the ratio of the one to the other. While the actual partial pressures of water vapor and hydrochloric acid vary greatly with temperature, their ratio remains nearly constant and undergoes only a slight and gradual change over the temperature range in any stage. For example, the ratio of decomposition to dehydration as calculated from the partial pressures of hydrochloric acid and water vapor is theoretically about 1 to 50 in stage II, 1 to 5 in stage III and 7 to 3 in stage IV. Therefore, while decomposition is still small in stage II, it becomes of material importance in stage III and in stage IV it normally greatly exceeds dehydration.

As indicated in the equations above, the decomposition of the several hydrated forms of the salt is a unimolecular reaction between the chloride itself and its water of crystallization. It is therefore substantially independent of the external atmosphere surrounding the salt during the drying process, since the salt in drying forms its own atmosphere in immediate contact with the surfaces thereof by the evaporation of its water of crystallization. The outer atmosphere, therefore, merely serves as a medium into which the water vapor expelled from the drying salt may be diffused and carried away. It is only necessary, then, that the outer atmosphere have a sufficiently low moisture content so as to permit diffusion and drying to take place at an economically practical rate.

From the foregoing it becomes apparent that the ratio of decomposition to dehydration within any one drying stage is approximately fixed and cannot be materially altered by the composition of the external atmosphere until stage IV is reached, wherein anhydrous $MgCl_2$ is formed. The latter, of course, is not capable of giving off vapors at the usual drying temperatures, and consequently the particles thereof do not form their own immediate atmosphere in the way that the hydrated forms of the salt do when they are being dried. The anhydrous salt, therefore, is susceptible to the effect of the surrounding atmosphere and may be decomposed by the moisture therein according to the equation:—

In stage IV, accordingly, the composition of the product is directly influenced by the atmosphere in which the drying is conducted, and the latter stage may be advantageously carried out in an atmosphere of hydrochloric acid, for example according to the process described in U. S. Patent 1,479,982 to Collings and Gann, in order to prevent excessive decomposition or to effect the reconversion of basic chloride or oxide to anhydrous chloride by reaction with such hydrochloric acid. Whereas Collings and Gann describe the drying of the dihydrate to the anhydrous salt in an atmosphere of hydrochloric acid, however, we have now found that no material advantage is derived in such method of drying until the monohydrate has been obtained.

As fully set forth above, we have found that normal hydrated magnesium chloride, $MgCl_2.6H_2O$, may be dried in air at least to the monohydrate with substantially no more decomposition than when the process is conducted either entirely or in part in an atmosphere of hydrochloric acid. Under properly controlled conditions the amount of decomposition occurring should not exceed, or at least should closely approach, the theoretically calculated amount. In practice, however, the product obtained by methods heretofore employed has contained a materially higher content of basic chloride, or oxide, than corresponded to the calculated amount. This condition, we have found, has been due to an overlapping of the various stages during the drying process, whereby a portion of the salt, after being partially dried, is rehydrated and dried again repeatedly, undergoing the usual amount of decomposition at each repetition of the drying. By preventing, or at least minimizing, such repetition of drying we have found that a product may be prepared by means of an air-drying process with a reduction in the amount of decomposition of as much as from 25 to 50 per cent as compared with present methods.

To the accomplishment of the foregoing and related ends the invention, then, consists in the steps hereinafter fully disclosed and particularly pointed out in the claims, the annexed drawings and following description setting forth various means by which the principle of the invention may be practiced.

In said annexed drawings:—

Figure 2:
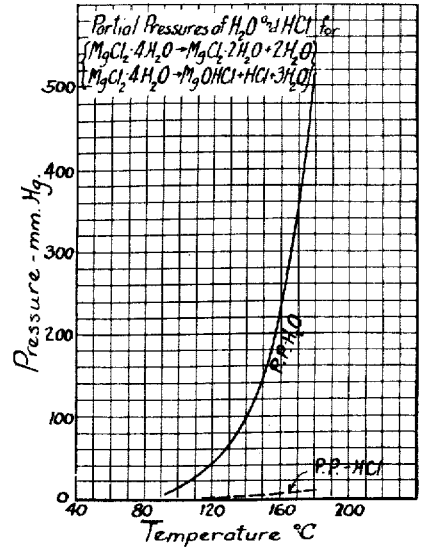
Figure 3:
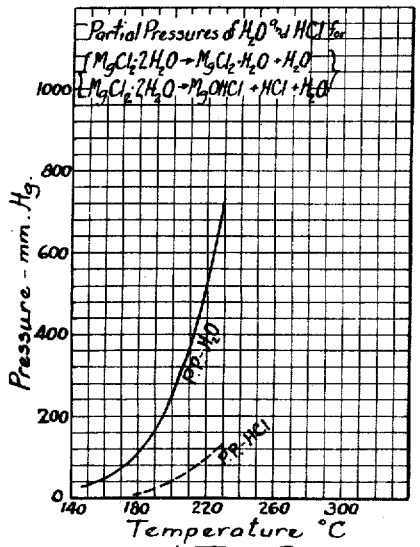
Figure 4:
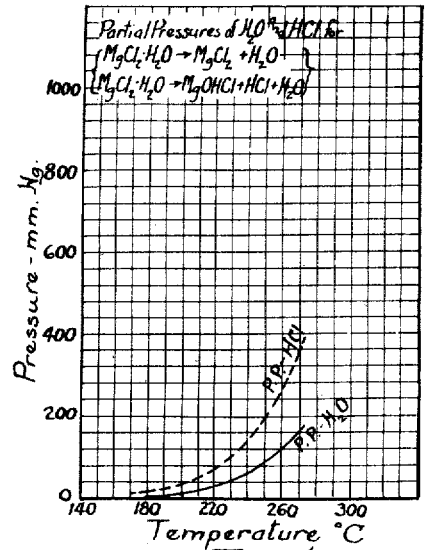
Figure 5:
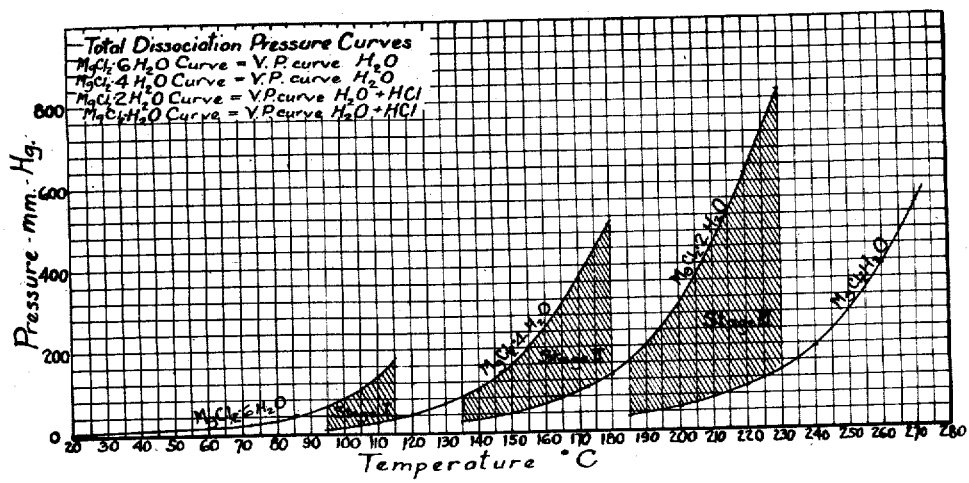
Figure 6:
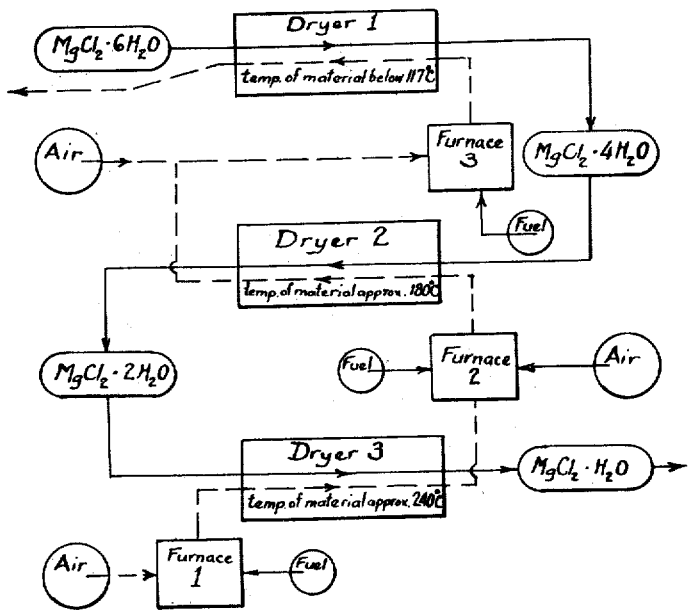

Fig. 1 is a curve representing the vapor pressure of water for magnesium chloride hexa-hydrate at temperatures up to the transition point thereof to the tetrahydrate. Figs. 2, 3 and 4, are curves showing the partial pressures of water vapor and hydrochloric acid for magnesium chloride tetrahydrate, dihydrate and monohydrate, respectively. Fig. 5 is a curve sheet showing the total dissociation pressure curves for the several hydrated forms of the salt. Fig. 6 is on the order of a flow sheet embodying one preferred mode of procedure for carrying out our improved process.

Present commercial processes for dehydrating normal hydrated magnesium chloride, $MgCl_2.6H_2O$, by drying directly in air involve forwarding the salt by mechanical means in a suitable dryer, either of shelf, rotary or other type, wherein such salt in a solid comminuted form is passed in contact with a current of heated air or of gases from the combustion of fuel, the rates of feed of the salt and of flow of gases being controlled so as to avoid incipient fusion, which would lead to stickiness and caking of the salt and interfere with the normal course of the drying. The product thereby obtained may be the dihydrate, as in the process described by Collings and Gann supra, or the monohydrate or lower hydrated material, as in the process described in the pending application of Barstow and Heath, Serial No. 373,108, filed June 24, 1929.

In either of the processes just referred to the material is caused to pass through two or more drying stages consecutively in one continuous operation, so that the charge in the dryer always contains one or more intermediate hydrated forms of the salt in addition to the initial salt fed to and the final product discharged from the dryer. When two or more drying stages are so combined there is necessarily an overlapping of such stages during the progress of the salt through the dryer. For example, in drying the hexahydrate to the dihydrate the transitions from the hexahydrate to the tetrahydrate and from the latter to the dihydrate are not sharp and distinct, but zones exist within the dryer wherein all three forms may be present together. Under such condition it is possible for some of the dihydrate, upon intermixture with hexahydrate, to revert back to the tetrahydrate, such tetrahydrate then requiring to be dehydrated a second time to the dihydrate. Such repetition of drying naturally entails a corresponding repetition of the characteristic amount of decomposition which accompanies the dehydration. The cumulative effect of such added increments of decomposition products in the intermediate stages accounts for the large discrepancy between the actual amount of basic chloride, or oxide, found in the final product and the theoretically calculated amount. Particularly when the process is carried out so as to yield a product having approximately the composition of the monohydrate is the above result of great practical significance. A monohydrate product containing not much more than the theoretical amount of basic chloride, or oxide, is an excellent raw material for feeding to the electrolytic cells for the manufacture of magnesium, for instance, according to the method described in U. S. Patent 1,567,318 to Cottringer and Heath, whereas a material having the larger amount of such decomposition products as made by the usual methods, when used in the electrolytic cells, may cause a marked diminution in yield and interfere with the smooth functioning of the cells. Furthermore, if such monohydrate is dried further to the anhydrous salt in an atmosphere of hydrochloric acid, a greater amount of costly dry hydrochloric acid gas is consumed than when a higher grade of monohydrate is thus employed.

Referring to the drawings, Fig. 1 is a curve showing the vapor pressure of water for $MgCl_2.6H_2O$ at temperatures up to 117° C. which is the transition point to $MgCl_2.4H_2O$. The maximum vapor pressure is only about 175 mm., so that the rate of drying in stage I is comparatively slow. This factor is of importance in processes combining stage I with one or more subsequent drying stages, inasmuch as the rate of drying for the whole process is necessarily limited to that permissible in stage I. On the other hand, if stage I were conducted independently in a separate dryer the capacity of such dryer could be proportioned relative to a dryer for the later stages so that a materially increased rate of drying for the whole process could be put in effect.

Figs. 2, 3 and 4 give curves showing the partial pressures of water vapor and of hydrochloric acid for $MgCl_2.4H_2O$, $MgCl_2.2H_2O$ and $MgCl_2.H_2O$, respectively, such curves being plotted in similar manner to Fig. 1. In Fig. 2 the partial pressure of hydrochloric acid, indicated by the broken line, is very small, in Fig. 3 it reaches a maximum of about 125 mm. at 230° C., and in Fig. 4 it is 360 mm. at 270° C. In Figs. 2 to 4 the ratio between the partial pressures of water vapor and hydrochloric acid does not change greatly over the temperature range given, so that although the curves for individual partial pressures rise steeply with temperature the ratio between them remains nearly constant at all temperatures.

In any stage of air-drying it is necessary that the water vapor pressure of the hot air or combustion gases be kept at a figure below the curve for the hydrated salt being dried, so that the water vapor given off from the salt may be enabled to diffuse away. If such water vapor pressure of the drying air is kept above the curve for the next lower hydrate, the latter, when formed normally in its appropriate stage, cannot be further dehydrated in the same stage. In other words, by properly controlling the temperature and/or vapor pressure of water in the drying air in any one stage it is possible to limit the drying to the formation of just the one hydrated form of the salt that is desired without the accompanying formation of the next lower form. Accordingly, in such case there can be no rehydration and repetition of drying, hence no overlapping of stages, and the decomposition will be limited to approximately the theoretical figure.

In Fig. 5 are shown the total dissociation pressure curves for each of the hydrated forms of magnesium chloride, plotted against temperatures, the total pressure being the sum of the partial pressures of water vapor and hydrochloric acid. The shaded portions indicate the approximate zones within which each separate stage of drying is to be carried out. If the atmosphere within the dryer at any stage of drying is maintained at a vapor pressure and temperature included within the corresponding shaded area, the drying will be limited to that one stage alone, without overlapping the following stage, and the decomposition will likewise be limited to a figure closely approaching the theoretically calculated amount.

The following example is given as an illustration of a method which may be employed for calculating the theoretical decomposition in any drying stage from the partial pressures of water vapor and hydrochloric acid. Taking stage II in which $MgCl_2.4H_2O$ is dried to $MgCl_2.2H_2O$, for example, the temperature is selected as 180° C. since such temperature in practice would give the highest drying rate below the transition point for the tetrahydrate, although a lower temperature may be selected equally well since the ratio of the partial pressures does not change greatly. The two equations involved are:—

(1) $MgCl_2.4H_2O \rightarrow MgCl_2.2H_2O + 2H_2O$
(2) $MgCl_2.4H_2O \rightarrow MgOHCl + HCl + 3H_2O$ The partial pressure of water vapor from $MgCl_2.4H_2O$ at 180° C. is 515 mm., and of hydrochloric acid from $MgCl_2.4H_2O$ is 4.6 mm. The total vapor pressure exerted by the reaction according to Eq. (2) is:—

4.6 mm. (HCl) + (3×4.6) mm. ($H_2O$) = 18.4 mm.

The total vapor pressure exerted by the reaction of Eq. (1) is:—

515 mm. − (3×4.6) mm. = 501.2 mm.

According to Eq. (1) 2 moles water vapor are formed per mole of solid product ($MgCl_2.2H_2O$), and in Eq. (2) 4 moles vapor are formed per mole solid product (MgOHCl). Consequently, for each mole of solid product formed in Eq. (2) twice the vapor pressure is exerted as for each mole of solid product formed in Eq. (1), and the theoretical molecular proportions of the solid products MgOHCl and $MgCl_2.2H_2O$ formed, as calculated from the corresponding vapor pressures, would be as 18.4/2 to 501.2, or $$\frac{1.8}{98.2}.$$

In other words, 1.8 moles MgOHCl are formed theoretically for 98.2 moles $MgCl_2.2H_2O$. Calculated as percentage by weight the amounts are $MgCl_2.2H_2O$ — 98.95 per cent and MgOHCl — 1.05 per cent, which represents the theoretical composition of the dried product of stage II.

The calculations for stages III and IV may be made in analogous fashion, allowing for the accumulation of MgOHCl from each stage to the next. The results of such calculation for stage III, assuming a drying temperature of 230° C. and corresponding partial pressure of water vapor 745 mm. and of hydrochloric acid 130 mm., give a product containing 86.5 per cent $MgCl_2.H_2O$ and 13.5 per cent MgOHCl by weight; for stage IV, assuming a drying temperature of 270° C. and corresponding partial pressure of water vapor 165 mm. and of hydrochloric acid 380 mm., the product contains 28.5 per cent $MgCl_2$ and 71.5 per cent MgOHCl.

The product of stage III, having approximately the composition as just stated, is suitable for introducing directly to the electrolytic cell for the manufacture of magnesium, as previously mentioned. The product of stage IV under usual circumstances may be treated with dry hydrochloric acid gas to convert it to anhydrous magnesium chloride.

The stage III product, however, as now obtained commercially by other direct drying methods, wherein the overlapping of drying stages is not prevented, contains a much larger amount of basic chloride, or oxide, and a correspondingly lower percentage of monohydrate. For example, the average product corresponding to stage III product, obtained in best current commercial practice, contains only about 69 to 70 per cent $MgCl_2.H_2O$. In other words, the decomposition thereof is slightly more than twice as much as the theoretical amount.

On the other hand, by carrying out the dehydration so as to secure a strict segregation of the individual drying stages and to avoid any material overstepping of the limits in any stage, whereby the possibility of rehydration and repetition of drying is largely prevented, we have been enabled to obtain a stage III product having an average composition of about 17 to 18 per cent MgOHCl and the balance $MgCl_2.H_2O$ including a slight amount of $MgCl_2.2H_2O$. The percentage of decomposition, represented by content of MgOHCl, was reduced from about 30 per cent to from 17 to 18 per cent. The average percentage of improvement, accordingly, was over 40 per cent. Such stage III product may then be air-dried further in stage IV with a corresponding gain, and the product either of stage III or stage IV may be completely dehydrated by heating in an atmosphere of dry HCl with a corresponding saving in the HCl consumed. In large scale commercial operations a saving of the above proportions involves large sums of money, and on occasion may determine the possibility of conducting the process at a loss or a profit.

Referring to Fig. 6, the flow sheet therein presented illustrates one preferred mode of procedure for carrying out our improved process whereby $MgCl_2.6H_2O$ is to be air-dried to a product having approximately the composition $MgCl_2.H_2O$. The raw material, $MgCl_2.6H_2O$, in the form of crystals, flakes or other comminuted form, is fed to dryer 1, which may be of rotary type, wherein the material passes in countercurrent to a stream of heated air and/or combustion gases introduced into the dryer from furnace 3. The temperature of the charge is to be controlled below 117° C., in order to avoid fusion of the material. The rate of feed of salt and the volume and temperature of heating gases are so adjusted relative to each other that the material discharged has a composition corresponding closely to the formula $MgCl_2.4H_2O$. It is advantageous, although not essential, to conduct the salt and heating gases in countercurrent relation to each other within the dryer in this stage, as in such way the hotter gases are in contact with the salt after the latter has been dried nearly to the desired extent, and danger of fusion is more easily avoided.

The product from dryer 1, having approximately the composition $MgCl_2.4H_2O$, is then conducted to dryer 2 wherein it is exposed to heating gases supplied from furnace 2, the material being maintained at a temperature of approximately 180° C. in this stage, and is discharged at a composition of approximately $MgCl_2.2H_2O$. The latter is then charged into dryer 3 wherein it is heated to a temperature of about 230° C to 240° C. by contact with heating gases from furnace 1, and discharged therefrom at a composition corresponding to $MgCl_2.H_2O$. In both of the preceding stages, i. e. stages II and III, it is preferable to pass the salt and heating gases in parallel current relation, for in this way the hotter gases are in contact with the more highly hydrated salt, and the prevention of overheating and consequent dehydration of the salt beyond the prescribed limit for the stage is most easily accomplished.

The heating gases are initially supplied to the system, for instance, by the combustion of fuel in furnace 1 and are introduced to dryer 3 which operates at the highest temperature. The gases discharged from dryer 3 are then reheated, if necessary, in furnace 2, wherein an additional quantity of hot gases may be added to make up the volume required for dehydrating the salt in stage II. From furnace 2 the mixed gases are conducted to dryer 2, and the exit gases from the latter are passed to furnace 3 for reheating, if required, and mixing with an additional volume of fresh heating gases. From furnace 3 the hot gases pass to dryer 1, and the exit gases therefrom are discharged into the atmosphere. Such mode of operation has two principal advantages; (1) the residual heat in the gases discharged from dryers 2 and 3 is conserved to the best advantage; (2) the moisture content of such gases, when introduced into the succeeding drying step, is normally approximately such as to prevent or restrain the dehydration of the salt in such step from proceeding beyond the prescribed limit. In other words such procedure tends automatically to maintain in the heating gases in stages I and II a sufficient partial pressure of water vapor so that the atmosphere in the dryer is maintained within the zone for the respective stages indicated by the shaded areas in Fig. 5.

When it is desired to carry the air-drying through stage IV the material discharged from dryer 3 may be conveyed to a fourth dryer wherein the salt temperature is preferably maintained at about 250° to 280° C., and the exit gases from such fourth dryer may be mixed with the heating gases introduced into dryer 3.

It may also at times be preferable to omit stage I of drying as herein described. In such case the normal hexahydrate salt might be dehydrated by fusing and evaporating it to produce a product having the composition of magnesium chloride tetrahydrate or at least consisting largely of such tetrahydrate. The product so obtained and prepared in solid comminuted form may then be introduced into stage II of the present process, and the succeeding steps carried out for the production of the monohydrate or lower hydrated material according to the procedure hereinbefore described.

In each of the various drying stages the approximate preferred operating temperature has been indicated in the foregoing detailed description, but other temperatures may be employed, if desired, keeping in mind the essential feature that the temperature of the atmosphere in contact with the chloride being dehydrated and the partial water vapor pressure therein shall be maintained at such values as to come within the shaded area for the stage in question, as shown in Fig. 5. In other words, the temperature is to be at a point such that the water vapor pressure of the hydrated salt being dried is sufficiently high to provide a suitable drying rate, but below the transition point for the hydrated salt formed in the stage in question, while the partial pressure of water vapor of the atmosphere within the dryer is maintained greater than the dissociation pressure of such lower hydrated salt being formed. Such partial pressure relation is readily maintained by adjusting the ratio of flow of the atmosphere current to the chloride current relative to the temperature, and rate of dehydration. The character of the product serves as a convenient check upon the control. In this way the dehydration within any stage is restricted to the formation of the hydrated salt desired to be produced therein, and an excess of dehydration in such step is substantially prevented. Consequently not more than two forms of the salt may exist together in any stage and overlapping of stages, with rehydration and repetition of drying, is avoided. Thereby the theoretical minimum amount of decomposition in any stage, or for the final product obtained, may be approached in actual practice far more closely than when such segregation of stages and control of drying is not provided.

In practice it may not always be necessary to maintain the partial pressure of water vapor of the atmosphere in any one stage strictly within the limits indicated by the shaded areas in Fig. 5 throughout the progress of the stage in question provided that the prescribed conditions are made effective during the latter part of the stage. During the early part of such stage there is slight possibility that drying of any material will proceed too far, even if the vapor pressure of the atmosphere near the feed end of the dryer should be less than the lower limit given. The atmosphere will take up moisture rapidly enough from the drying salt to reach the proper degree of saturation before it is practically feasible for any of the initially dried material to be dried further to the next stage of dehydration. It becomes most essential, therefore, to maintain control of the vapor pressure of the atmosphere within the dryer only toward the latter part of any drying stage in order to accomplish the results described and claimed herein.

Although in the detailed procedure just described the heat required for drying the salt in the various stages was shown as being supplied entirely by a stream of hot gases, at least a portion of the heat may also, if desired, be provided by enclosing one or more of the dryers in a suitable furnace setting and heating the dryer externally, or electric resistor elements may be placed within the dryer.

In the foregoing description the decomposition occuring in the various stages has been indicated as taking place with the formation of a basic chloride, for example, according to an equation such as:—

$$MgCl_2.4H_2O \rightarrow MgOHCl + HCl + 3H_2O$$

This conception best accords with experimental evidence. However, the decomposition may also be thought of as proceeding according to the equation:—

$$MgCl_2.4H_2O \rightarrow MgO + 2HCl + 3H_2O$$

In such case, the conversion of the analytical results from one basis to the other may be calculated in accordance with the equation:—

$$2MgOHCl \rightarrow MgO + MgCl_2 + H_2O$$

Naturally, the advantages gained by means of our improved mode of operation will be the same in any case, regardless of the method of calculation employed.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process of dehydrating magnesium chloride which comprises drying magnesium chloride hexahydrate to a product having the composition approximately of magnesium chloride tetrahydrate, drying such tetrahydrate to a product consisting essentially of magnesium chloride dihydrate and further drying such dihydrate to a product consisting chiefly of magnesium chloride monohydrate, said steps being conducted consecutively but separately and independently of each other whereby substantially to avoid rehydration and repetition of drying of partially dried material in any step.

2. A process of dehydrating magnesium chloride which comprises drying magnesium chloride hexahydrate by heating in air or the gaseous products of the combustion of fuel at a temperature below 117° C. until a product having the composition approximately of magnesium chloride tetrahydrate is obtained, drying such tetrahydrate in similar manner at a temperature between 117° and 180° C. to a product consisting essentially of magnesium chloride dihydrate and further drying such dihydrate at a temperature between 180° and 240° C. to a product consisting chiefly of magnesium chloride monohydrate, said steps being conducted consecutively but separately and independently of each other whereby substantially to avoid rehydration and repetition of drying of partially dried material in any step.

3. A process of dehydrating magnesium chloride which comprises drying magnesium chloride hexahydrate at a temperature below 117° C. by bringing the same in a dryer into contact with a heated gaseous current passed in countercurrent relation thereto, while regulating the feed of salt and flow of hot gases so that the material is discharged from the dryer at a composition closely approximating that of magnesium chloride tetrahydrate, conveying the latter to a second dryer and heating the same at a temperature between 117° and 180° C. by means of a heated gaseous current passed in parallel relation to the direction of travel of the salt therein until a product consisting essentially of magnesium chloride dihydrate is formed and conveying such last-named product to a third dryer and further drying same at a temperature between 180° and 240° C. by means of a heated gaseous current passed in parallel relation thereto to form a product consisting chiefly of magnesium chloride monohydrate.

4. A process of dehydrating magnesium chloride which comprises drying magnesium chloride hexahydrate at a temperature below 117° C. by bringing the same in a dryer into contact with a heated gaseous current passed in countercurrent relation thereto, while regulating the feed of salt and flow of hot gases so that the material is discharged from the dryer at a composition closely approximating that of magnesium chloride tetrahydrate, conveying the latter to a second dryer and heating the same at a temperature between 117° and 180° C. by means of a heated gaseous current passed in parallel relation to the direction of travel of the salt therein until a product consisting essentially of magnesium chloride dihydrate is formed and conveying such last-named product to a third dryer and further drying same at a temperature between 180° and 240° C. by means of a heated gaseous current passed in parallel relation thereto to form a product consisting chiefly of magnesium chloride monohydrate, the heating gases from the last drying stage being employed to supply at least part of the heat in the second drying stage, and the gases from the second stage being likewise employed in the first drying stage.

5. A process of dehydrating magnesium chloride which comprises drying magnesium chloride hexahydrate at a temperature below 117° C. by bringing the same in a dryer into contact with a heated gaseous current in countercurrent relation thereto, while regulating the feed of salt and flow of hot gases so that the material is discharged from the dryer at a composition closely approximating that of magnesium chloride tetrahydrate, conveying the latter to a second dryer and heating the same at a temperature between 117° and 180° C. by means of a heated gaseous current passed in parallel relation to the direction of travel of the salt therein until a product consisting essentially of magnesium chloride dihydrate is formed, conveying such last-named salt to a third dryer and further drying same at a temperature between 180° and 240° C. by means of a heated gaseous current passed in parallel relation thereto to form a product consisting chiefly of magnesium chloride monohydrate and finally drying the latter to an end product consisting of a mixture of anhydrous magnesium chloride and basic magnesium chloride.

6. A process of dehydrating magnesium chloride which comprises drying magnesium chloride hexahydrate at a temperature below 117° C. by bringing the same in a dryer into contact with a heated gaseous current in countercurrent relation thereto, while regulating the feed of salt and flow of hot gases so that the material is discharged from the dryer at a composition closely approximating that of magnesium chloride tetrahydrate, conveying the latter to a second dryer and heating the same at a temperature between 117° and 180° C. by means of a heated gaseous current passed in parallel-relation to the direction of travel of the salt therein until a product consisting essentially of magnesium chloride dihydrate is formed, conveying such last-named salt to a third dryer and further drying same at a temperature between 180° and 240° C. By means of a heated gaseous current passed in parallel relation thereto to form a product consisting chiefly of magnesium chloride monohydrate and finally drying the latter to an end product consisting of a mixture of anhydrous magnesium chloride and basic magnesium chloride, the heating gases from each of the last three drying stages, respectively, being employed to supply at least part of the heat in the preceding drying stage.

7. A process of dehydrating magnesium chloride which contains the steps of drying a salt having the approximate composition of magnesium chloride tetrahydrate at a temperature between 117° and 180° C. to a product consisting substantially of magnesium chloride dihydrate, and further drying such dihydrate at a temperature between 180° and 240° C., said steps being conducted consecutively but independently of each other whereby substantially to avoid rehydration and repetition of drying of partially dried material in such steps.

8. In a process for dehydrating magnesium chloride, the step which consists in heating any hydrated form thereof higher than the monohydrate to a temperature at which water vapor is evolved but below the temperature of incipient fusion and in contact with an atmosphere in which the partial pressure of the gaseous products of dehydration is maintained above the dissociation pressure of the next lower hydrated form thereof, such heating being continued until such hydrate is substantially completely dehydrated to the next lower hydrated form of the salt.

9. In a process for dehydrating magnesium chloride, the step which consists in heating any hydrated form thereof higher than the monohydrate in a comminuted condition to a temperature at which water vapor is evolved but below the temperature of incipient fusion and in contact with an atmosphere in which the partial pressure of the gaseous products of dehydration is maintained above the dissociation pressure of the next lower hydrated form thereof, such heating being continued until such hydrate is substantially completely dehydrated to the next lower hydrated form of the salt.

10. In a process for dehydrating magnesium chloride, the step which consists in heating any dehydrated form thereof higher than the monohydrate in a comminuted condition to a temperature at which water vapor is evolved but below the temperature of incipient fusion and in contact with an aeriform current in which the partial pressure of the gaseous products of dehydration is maintained above the dissociation pressure of the next lower hydrated form thereof, such heating being continued until such hydrate is substantially completely dehydrated to the next lower hydrated form of the salt.

11. In a continuous process for dehydrating magnesium chloride, the step which consists in heating a stream of any hydrated form thereof higher than the monohydrate in a comminuted condition to a temperature at which water vapor is evolved but below the temperature of incipient fusion and in contact with an aeriform current in which the partial pressure of the gaseous products of dehydration is maintained above the dissociation pressure of the next lower hydrated form thereof, such heating being continued until such hydrate is substantially completely dehydrated to the next lower hydrated form of the salt.

12. In a continuous process for dehydrating magnesium chloride, the steps which consist in heating a stream of solid comminuted magnesium chloride containing hexahydrated chloride until substantially all converted to the tetrahydrate, heating such tetrahydrate until substantially no hydrated form other than that containing two molecules of crystal water remains, then heating such dihydrate until substantially no hydrated form other than that containing one molecule of crystal water remains, and conducting such heating steps separately and successively at increasing temperatures at which water vapor will be evolved but at temperatures below the temperatures of incipient fusion of the chloride being dehydrated and in contact with an aeriform current in which the partial pressure of the gaseous products of dehydration of such chloride is at all times maintained in excess of the dissociation pressure of the lower hydrated form to be produced in such step.

13. In a process for dehydrating magnesium chloride, the step which consists in heating any hydrated form thereof higher than the monohydrate to a temperature at which water vapor is evolved therefrom but below the temperature of incipient fusion thereof and in contact with an atmosphere in which the partial pressure of the gaseous products of dehydration exceeds the dissociation pressure of the next lower hydrated form at least during the final part of said step.

Signed by me this 7th day of September, 1929.

ALBERT KELVIN SMITH.

Signed by me this 30th day of August, 1929.

WILLIAM R. VEAZEY.

tained in excess of the dissociation pressure of the lower hydrated form to be produced in such step.

13. In a process for dehydrating magnesium chloride, the step which consists in heating any hydrated form thereof higher than the monohydrate to a temperature at which water vapor is evolved therefrom but below the temperature of incipient fusion thereof and in contact with an atmosphere in which the partial pressure of the gaseous products of dehydration exceeds the dissociation pressure of the next lower hydrated form at least during the final part of said step.

Signed by me this 7th day of September, 1929.

ALBERT KELVIN SMITH.

Signed by me this 30th day of August, 1929.

WILLIAM R. VEAZEY.

CERTIFICATE OF CORRECTION.

Patent No. 1,835,818.  Granted December 8, 1931, tó

ALBERT KELVIN SMITH ET AL.

It is hereby certified that error appears in the printed specification of the above numbered patent requiring correction as follows: Page 7, line 84, claim 10, for "dehydrated" read hydrated; and that the said Letters Patent should be read with this correction therein that the same may conform to the record of the case in the Patent Office.

Signed and sealed this 16th day of February, A. D. 1932.

(Seal)

M. J. Moore,
Acting Commissioner of Patents.

CERTIFICATE OF CORRECTION.

Patent No. 1,835,818. Granted December 8, 1931, to

ALBERT KELVIN SMITH ET AL.

It is hereby certified that error appears in the printed specification of the above numbered patent requiring correction as follows: Page 7, line 84, claim 10, for "dehydrated" read hydrated; and that the said Letters Patent should be read with this correction therein that the same may conform to the record of the case in the Patent Office.

Signed and sealed this 16th day of February, A. D. 1932.

(Seal)

M. J. Moore,
Acting Commissioner of Patents.